(12) United States Patent
Chiocchi et al.

(10) Patent No.: US 11,038,764 B2
(45) Date of Patent: Jun. 15, 2021

(54) ESTABLISHING COMMUNICATION BETWEEN NODES ON A CONNECTION NETWORK

(71) Applicant: Microsoft Technology Licensing, LLC, Redmond, WA (US)

(72) Inventors: Alexander A. Chiocchi, Sunnyvale, CA (US); Thomas M. Lee, Sunnyvale, CA (US); Scott K. Winkleblack, Sunnyvale, CA (US); Brian L. Frank, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 318 days.

(21) Appl. No.: 15/851,724

(22) Filed: Dec. 21, 2017

(65) Prior Publication Data
US 2019/0199594 A1   Jun. 27, 2019

(51) Int. Cl.
*H04L 12/24* (2006.01)

(52) U.S. Cl.
CPC .............. *H04L 41/12* (2013.01); *H04L 41/14* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 7,685,016 B2 | 3/2010 | Flores et al. | |
| 7,689,537 B2 | 3/2010 | Goodwin et al. | |
| 7,716,140 B1 | 5/2010 | Nielsen et al. | |
| 8,510,380 B2 | 8/2013 | Faller et al. | |
| 8,533,110 B2 | 9/2013 | Kremen et al. | |
| 8,577,748 B1 | 11/2013 | Tobin, Jr. | |
| 9,049,249 B2 | 6/2015 | Zhang et al. | |
| 9,411,891 B2 | 8/2016 | Li et al. | |
| 9,886,522 B2 | 2/2018 | Zhang et al. | |
| 2005/0055450 A1 | 3/2005 | Gang | |
| 2007/0005750 A1 | 1/2007 | Lunt et al. | |
| 2007/0174304 A1 | 7/2007 | Shrufi et al. | |
| 2008/0208988 A1 | 8/2008 | Khouri et al. | |
| 2009/0234686 A1 | 9/2009 | Chakra et al. | |
| 2011/0258316 A1 | 10/2011 | Rizk | |
| 2012/0015741 A1 | 1/2012 | Craine et al. | |
| 2012/0023085 A1 | 1/2012 | Bellerive et al. | |
| 2012/0036209 A1 | 2/2012 | Lewis et al. | |
| 2012/0136852 A1 | 5/2012 | Geller | |
| 2012/0311030 A1 | 12/2012 | Lin et al. | |

(Continued)

OTHER PUBLICATIONS

"Non Final Office Action Issued in U.S. Appl. No. 15/202,975", dated Aug. 2, 2019, 21 Pages.

(Continued)

*Primary Examiner* — Jeffrey R Swearingen
(74) *Attorney, Agent, or Firm* — Hickman Becker Bingham Ledesma LLP; Christine E. Orich

(57) ABSTRACT

Technologies for initiating communication with an unreachable node are disclosed. In an embodiment, a connector sub-network is interposed between a connection network and a member sub-network. A connector node of the connector sub-network is identified and used to initiate communication between a member node and a target node in the connection network.

20 Claims, 9 Drawing Sheets

(56) References Cited

U.S. PATENT DOCUMENTS

| | | |
|---|---|---|
| 2012/0331568 A1 | 12/2012 | Weinstein et al. |
| 2013/0165234 A1 | 6/2013 | Hall et al. |
| 2013/0174275 A1 | 7/2013 | Micucci et al. |
| 2013/0262258 A1 | 10/2013 | Jennings |
| 2014/0032659 A1 | 1/2014 | Marini et al. |
| 2014/0195449 A1 | 7/2014 | Komissarchik et al. |
| 2014/0222702 A1 | 8/2014 | Jennings |
| 2014/0274404 A1 | 9/2014 | Hoskins et al. |
| 2014/0358880 A1 | 12/2014 | Li et al. |
| 2015/0254371 A1 | 9/2015 | Zhang et al. |
| 2016/0314216 A1 | 10/2016 | Li et al. |
| 2017/0344553 A1* | 11/2017 | Evnine ............... G06Q 30/0269 |
| 2018/0129960 A1* | 5/2018 | Caballero .......... G06Q 30/0224 |

OTHER PUBLICATIONS

"Final Office Action Issued in U.S. Appl. No. 15/202,975", dated Apr. 20, 2020, 23 Pages.

"Final Office Action Issued in U.S. Appl. No. 13/907,379", dated May 2, 2014, 14 Pages.

"Final Office Action Issued in U.S. Appl. No. 13/907,379", dated Aug. 14, 2015, 11 Pages.

"Non-Final Office Action Issued in U.S. Appl. No. 13/907,379", dated Feb. 26, 2015, 10 Pages.

"Non-Final Office Action Issued in U.S. Appl. No. 13/907,379", dated Aug. 28, 2013, 12 Pages.

Farhadi, et al., "TeamFinder: A Co-clustering Based Framework for Finding an Effective Team of Experts in Social Networks", In IEEE 12th International Conference on Data Mining Workshops, Dec. 10, 2012, pp. 107-114.

Thushar, et al., "An RDF Approach for Discovering the Relevant Semantic Associations in a Social Network", In 16th International Conference on Advanced Computing and Communications, Dec. 14, 2008, pp. 214-220.

* cited by examiner

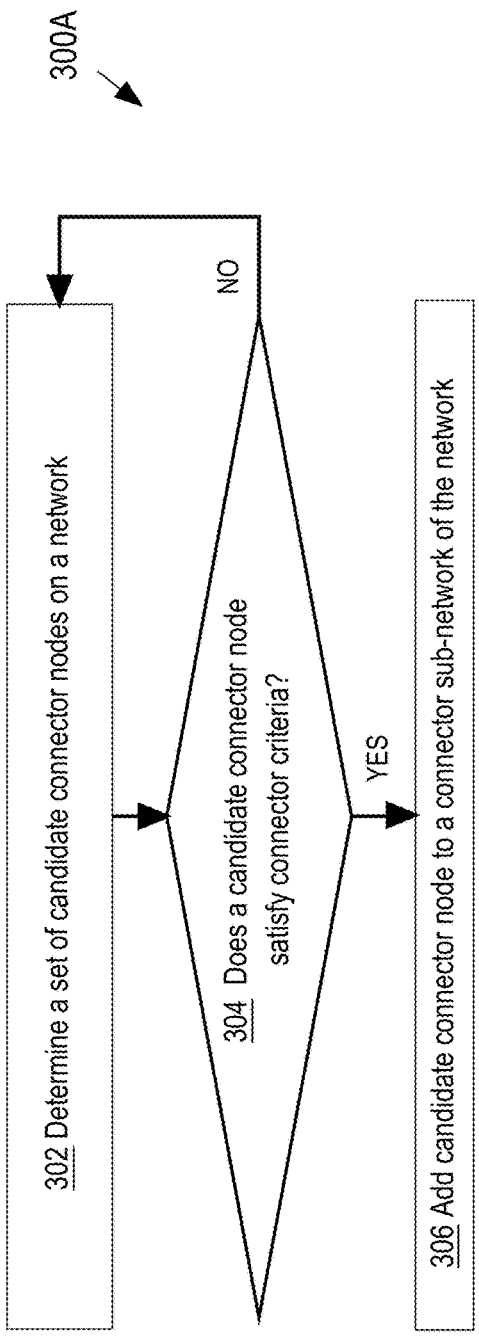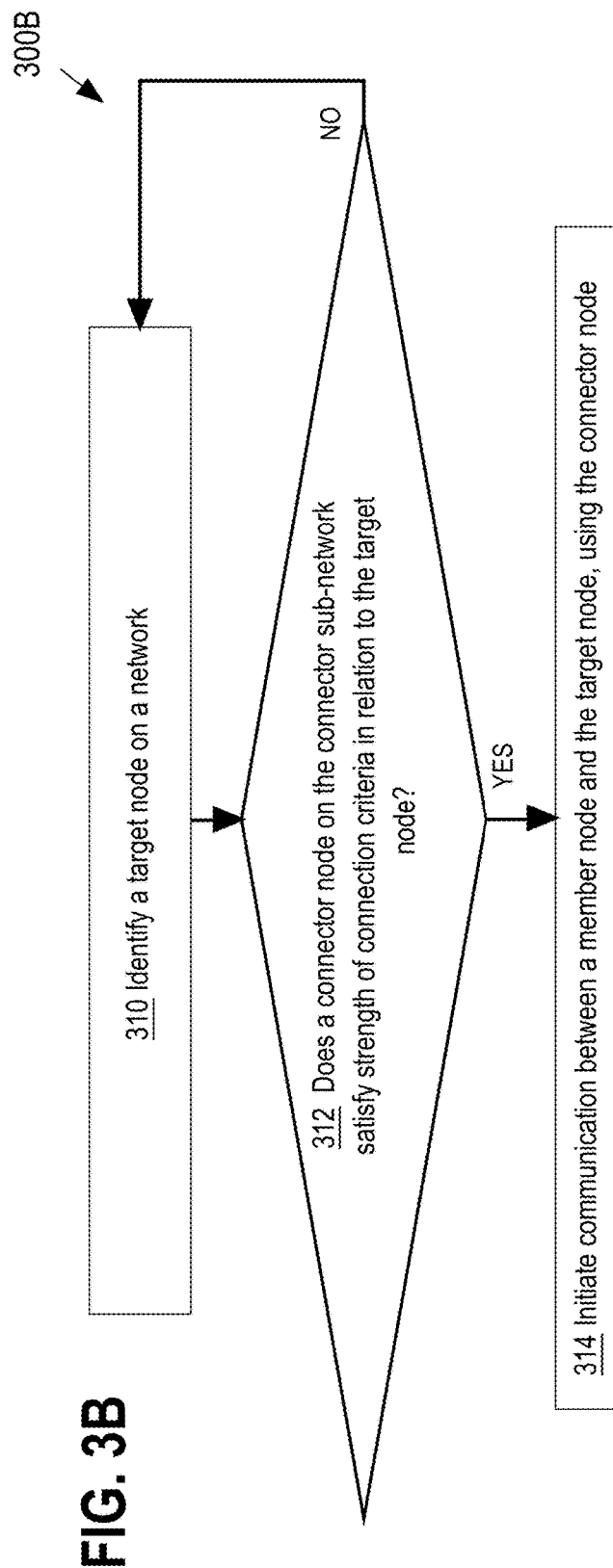
FIG. 3A
FIG. 3B

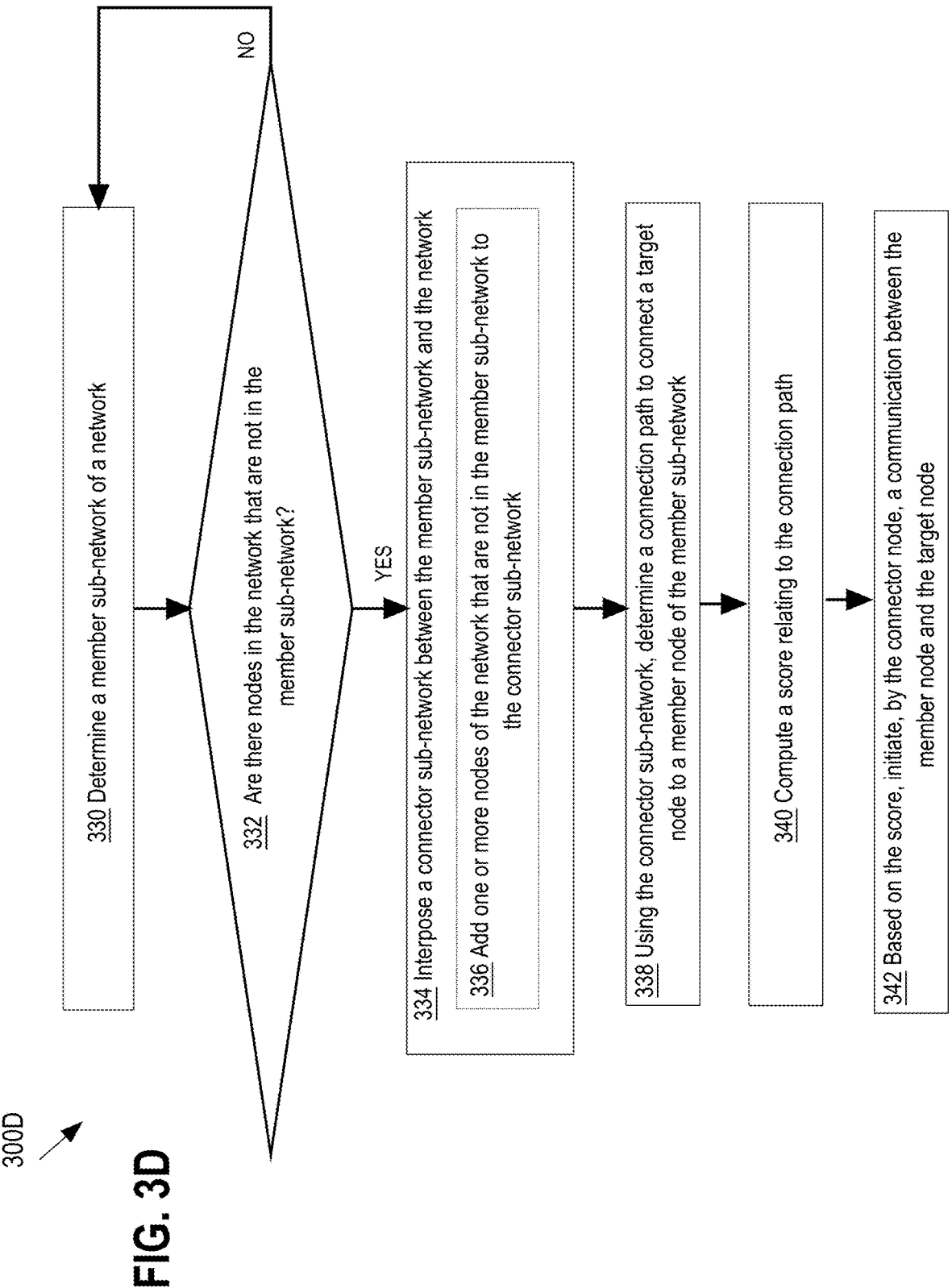

ESTABLISHING COMMUNICATION BETWEEN NODES ON A CONNECTION NETWORK

TECHNICAL FIELD

The present disclosure relates to online connection networks and related computing systems, and more particularly to techniques for establishing communication between nodes on a connection network.

BACKGROUND

In a connection network, a node can be considered reachable by another node if there is a path between the two nodes. A path can include one or more connections and zero or more intermediate nodes. When two nodes are not connected by a path of any length, the nodes may be considered unreachable relative to each other.

Algorithms that measure the strength of connection paths in a connection network often assume that the shortest path between two nodes is the strongest or most efficient way of establishing communication between the two nodes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3A is a flow diagram that depicts a process for determining a set of candidate connector nodes, in an embodiment;

FIG. 3B is a flow diagram that depicts a process for initiating communication between a connector node and a target node, in an embodiment;

FIG. 3D is a flow diagram that depicts a process for interposing a connector sub-network between a network and a member sub-network, in an embodiment;

DETAILED DESCRIPTION

Figure 1:
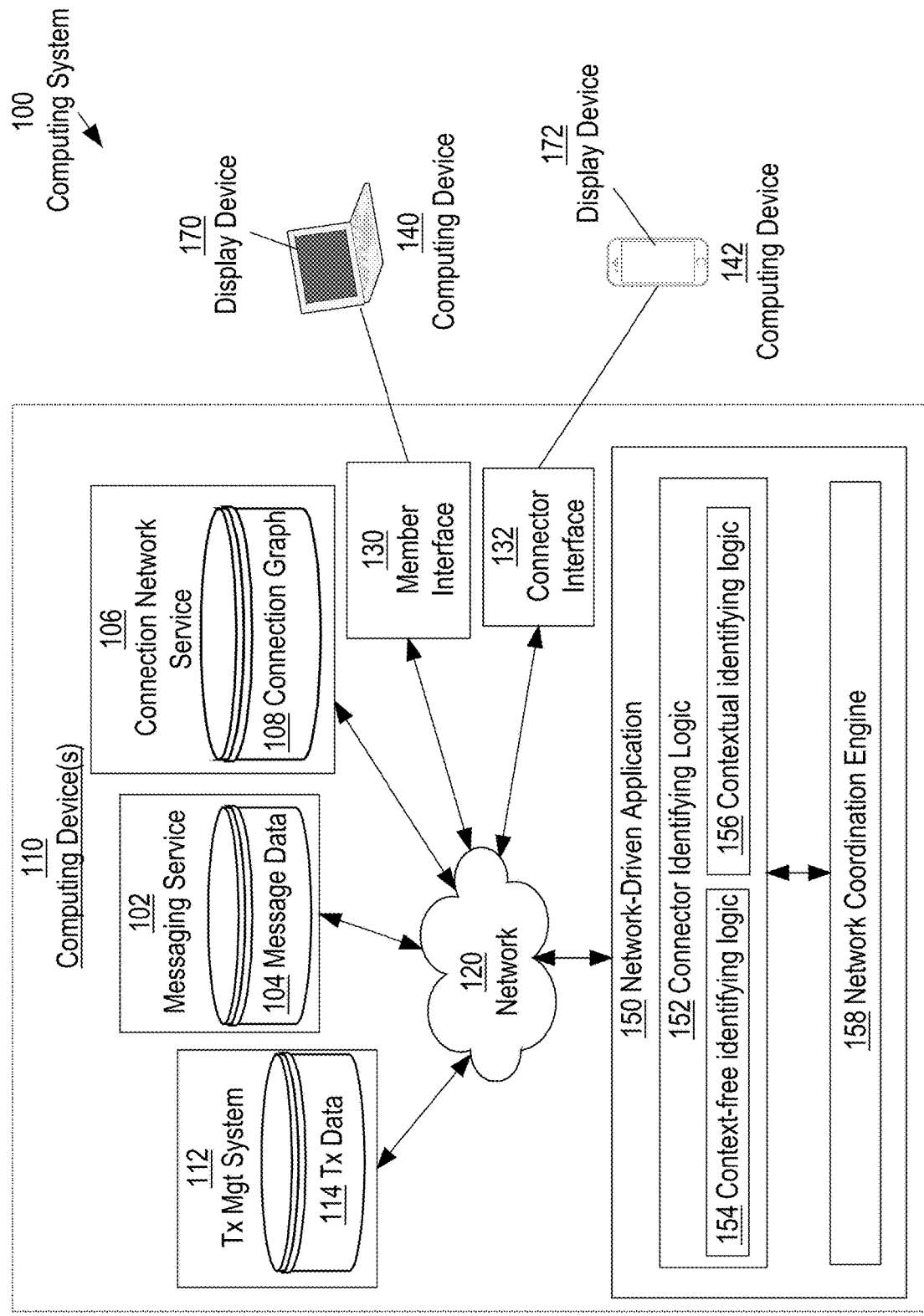
FIG. 1 is a block diagram that depicts an example system for establishing communication between nodes on a network, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

It is often challenging for a node on a connection network to establish communication with an unreachable node. Even if a connection path exists, the ability of a node to establish communication with another node is not certain. Moreover, even if communication between the nodes is established, the quality of the communication may be low from the perspective of either or both of the nodes and, consequently, the likelihood of a desired outcome of the communication may be diminished.

This disclosure describes technologies for establishing communication between two nodes on a connection network. The disclosed technologies can increase the likelihood of a desirable outcome of the communication, particularly in instances where one or more of the nodes initially may appear to be unreachable.

In one approach, a connector node is identified and used to initiate communication between two other nodes on a connection network. In some implementations, the connector node may be identified based on an analysis of data associated with the connector node, which may include public data that is obtained from outside of the connection network and/or other data that is used with the permission of the connector node.

Approaches described herein address the technical problem of establishing communication between two nodes on a network, particularly when the strength of connection between the nodes is weak or uncertain. The disclosed approaches improve upon known systems by, among other things, identifying a connection path between two nodes without assuming that the shortest path is the best path.

Using aspects of the disclosed approaches, a connection network or a related system can improve the likelihood and/or quality of communications between two nodes on the connection network.

System Overview

In a connection network, a search query can be executed to identify nodes with which another node is or is not already connected. When the results of the search query are returned, the connection network may identify existing connection paths between a node that is the subject of the search and one or more of the nodes that are returned by the query. The connection network can establish a connection between two nodes in response to a request by one of the nodes and acceptance of the request by the other node.

A connection network as used herein may refer to a computer-implemented online system, such as a professional networking service or a social network application, which may be provided by, for example, a social network service. In a connection network, a node may refer to a computer-implemented representation of an entity, such as a person or an organization, that uses the connection network via a computing device. A node can be implemented, for example, as a data object or a record that is stored in a database. The node contains or is associated with stored data that identifies the node and the entity that the node represents. The stored data may include identifier data such as the entity name, and may contain other data associated with the entity, such as organizations with which the entity is affiliated, geographic locations, interests, and dates of connection.

A connection as used herein may refer to a computer-implemented logical relationship between two nodes on a connection network. The logical relationship can be formed based on mutual consent of the entities represented by the nodes, as evidenced by an exchange of electronic messages between the nodes. The connection may have associated attributes, such as affiliations or interests that the entities represented by the nodes have in common. "Logical" as used herein may refer to a connection that is made by execution of computer-implemented instructions manipulating a data structure, for example, as opposed to a physical or hard-wired connection. In other words, a logical connection may refer to a software abstraction of a physical connection.

A connection can be implemented, for example, by instantiating a data object or a record that is stored in a database. The connection contains or is associated with data that identifies the connected nodes (such as unique node identifiers), and may contain other data associated with the connection (or references to such data, implemented in software as, for example, pointers or hyperlinks), including the date that the connection was established and attributes that the connected nodes have in common.

A connection graph or connection graph data as used herein may refer to a computer-implemented representation of nodes and the connections that exist between the nodes in a connection network. Portions of a connection graph or connection graph data may be displayed in a graphical interface on a display device, alone or in combination with other elements of the graphical interface. An absence of connections between two nodes is indicated by an absence of connections (links) in a connection graph; for example, a lack of logical relationships linking node data for the two nodes in a database.

Software platforms can leverage the connection network to provide domain-specific functionality. For example, content distribution, recruiting, marketing, and sales platforms can access and query the connection network through application programming interfaces (APIs). As used herein, "network-driven application" may refer to any of these and/or other types of software platforms that may obtain data from a connection network.

FIG. 1 is a block diagram that depicts an example computing system 100 arranged to operate a network-driven application 150, a member interface 130, and a connector interface 132, leveraging information obtained from a connection network 106 and optionally one or more of a messaging service 102 or a transaction management system 112, in an embodiment. Computing system 100 includes computing device(s) 110, computing devices 140, 142, and display devices 170, 172, which are communicatively coupled to an electronic communications network 120.

Implemented in the devices 110, 140, 142, 170, 172 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1 as messaging service 102, message data 104, connection network 106, connection graph 108, member interface 130, connector interface 132, and network-driven application 150. Network-driven application 150 includes connector identifying logic 152, which includes context-free identifying logic 154, contextual identifying logic 156, and network coordination engine 158.

"System" as used herein may refer to a single computer or network of computers and/or other devices. "Computing device" as used herein may refer to a computer or any other electronic device that is equipped with a processor. Although computing system 100 may be implemented with any number of messaging service 102, message data 104, connection network 106, connection graph 108, transaction management system 112, transaction data 114, member interface 130, connector interface 132, network-driven application 150, computing device(s) 110, display devices 170, 172 and computing devices 140, 142, respectively, in this disclosure, these elements may be referred to in the singular form for ease of discussion.

Messaging service 102, message data 104, connection network 106, connection graph 108, member interface 130, network-driven application 150 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

Member interface 130 and connector interface 132 enable access to different portions of the functionality of computing system 100, by computing devices 140, 142. The illustrative messaging service 102 and connection network 106 are communicatively coupled to computing device 140 by member interface 130 and to computing device 142 by connector interface 132. Transaction management system 112 and network-driven application 150 are communicatively coupled to computing device 140 by member interface 130. In at least some implementations, transaction management system 112 and network-driven application 150 are not communicatively coupled to connector interface 132.

Portions of the illustrative messaging service 102, connection network 106, transaction management system 112, and network-driven application 150 may be implemented as web-based software applications and hosted by a hosting service (not shown). For example, member interface 130, network-driven application 150, and portions of connection network 106 may be implemented as client-side and server-side portions, respectively, of a social selling platform such as the SALES NAVIGATOR software, which is commercially available from LinkedIn Corporation of Sunnyvale, Calif., while connector interface 132 and connection network 106 may be implemented as client-side and server-side portions, respectively, of a connection network service such as the LINKEDIN software, which is commercially available from LinkedIn Corporation of Sunnyvale, Calif. In an embodiment, portions of each of member interface 130 and connector interface 132 are implemented in a web browser that can execute on computing devices 140, 142, respectively.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computing device 110 is a server-side computing device such as a server computer or network of server computers accessible by the Internet, for example in a public or private cloud. As illustrated in FIG. 1, each of display devices 170, 172 is implemented in a computing device 140, 142, respectively, but may be implemented as a separate device or as part of another device, or as multiple networked display devices, in other implementations.

The example messaging service 102 creates, sends and receives electronic communications between nodes of the connection network 106. Portions of messaging service 102 may be implemented as a text messaging service such as SMS (Short Message Service) or MMS (Multimedia Messaging Service), or as a public or private electronic mail system, or as a messaging service that is tightly coupled with the connection network 106 in that messages may only be sent to other nodes within the connection network (for example, the LINKEDIN INMAIL software, which is commercially available from LinkedIn Corporation of Sunnyvale, Calif.). The information maintained by messaging service 102, including the contents of messages transmitted over the network 120 by messaging service 102, is stored in message data 104, which may be implemented using an electronic file system or a table-based relational database or a hierarchical database, for example.

Connection network 106 is a computer-implemented networking service for entities, such as a professional networking service or an online social network. Connection network 106 contains nodes that represent the entities using the connection network 106. Data associated with nodes and connections between nodes are represented using connection graph 108. Portions of connection graph 108 and/or associated data are stored in a data structure, such as a graph-based database system or a relational database system. In the context of connection network 106, "node" may refer to a software abstraction of entity data, and need not be tied to any particular hardware or machine that is connected to network 120.

Some implementations of connection network 106 allow entities (via users operating electronic devices) to register with connection network 106 (thereby creating a node on connection network 106), create entity data (for example, profile data), establish connections with other registered entities, and perform other actions, such as message other entities, post articles, view postings from other entities, comment on postings, "like" postings, endorse other entities or established connections, etc. An entity profile may include, for example, a name of the entity, a job title, a job industry, academic institutions attended, employment status, previous and current employers, skills, endorsements from other entities, contact information, address information.

Transaction management system 112 is a database system (such as a customer relationship management or CRM database system) that stores and manages transaction-related information about entities that may or may not be registered on connection network 106. Such entities may include sales prospects to which sales of one or more products or services are desired or intended to be made. Such transaction-related entity information is stored in transaction data 114, which is implemented as a searchable database system, such as a graph-based database system or a table-based relational database system or a hierarchical database system, for example. The stored transaction information may include numerous data records, where each data record may indicate, for example, a person or entity name, an address, a phone number, an email address, an IM (instant messaging) address, a web address, an employer name, a job title, an activity log.

Message data 104, connection graph 108, and transaction data 114 can be searched by computing system 100 using a query language (such as the structured query language or SQL) to find information, such as entity information and content of interest, that may be relevant to a particular node or connection path on the connection network 106. Searching of message data 104, connection graph 108, transaction data 114 can be performed by messaging service 102 and/or query functionality of connection network 106 cooperating with context-free identifying logic 154 and/or contextual identifying logic 156, for example by application programming interface (API) calls. Context-free identifying logic 154 and contextual identifying logic 156 are described in more detail below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Figure 4A:
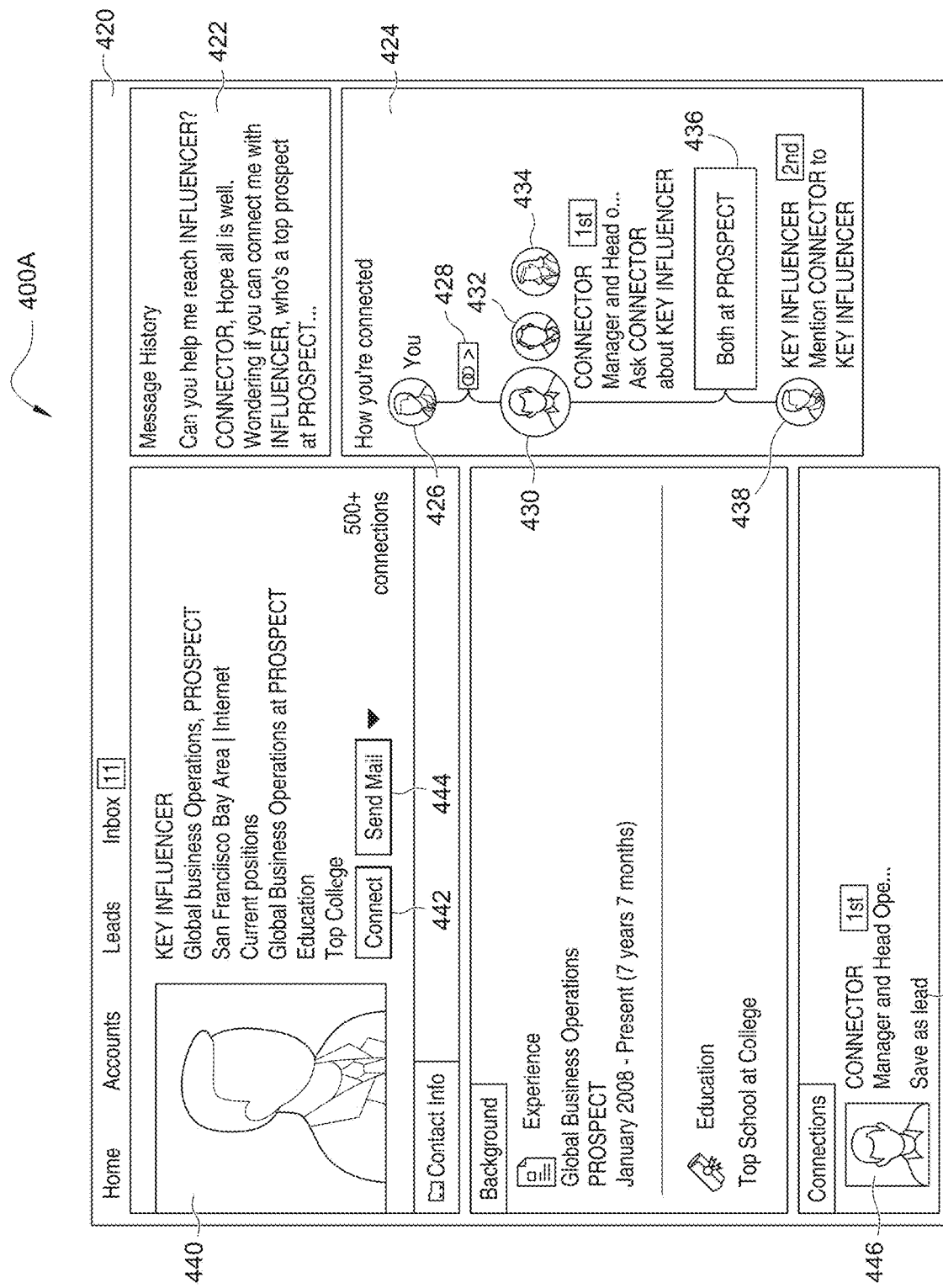
FIG. 4A is a screen capture of an example user interface that displays a set of candidate connector nodes to a member node, in an embodiment.

Computing device 140 operates member interface 130 to establish logical connection(s) over network 120 with portions of network-driven application 150 and may establish logical connection(s) over network 120 with messaging service 102, connection network 106, and/or transaction management system 112, either directly or via network-driven application 150. An example of a view that may be displayed by member interface 130 on display device 170 is shown in FIG. 4A and described below. A view as used herein may refer to a window of a graphical user interface (GUI), or a portion of a window, such as a text display box, an image, a graphical element, or any combination of GUI elements.

Figure 4B:
FIG. 4B is a screen capture of an example user interface that displays an interactive message that may be transmitted to a connector node, in an embodiment.

Computing device 142 operates connector interface 132 to establish logical connection(s) over network 120 with portions of messaging service 102 and/or connection network 106. An example of a view that may be displayed by connector interface 132 on display device 172 is shown in FIG. 4B and described below.

Components of network-driven application 150 operate to determine and control the data that is displayed on display devices 170, 172 via member interface 130 and connector interface 132. Connector identifying logic 152 of network-driven application 150 is executable by network-driven application 150 to identify candidate connector nodes and/or connector nodes on connection network 106.

Figure 2A:
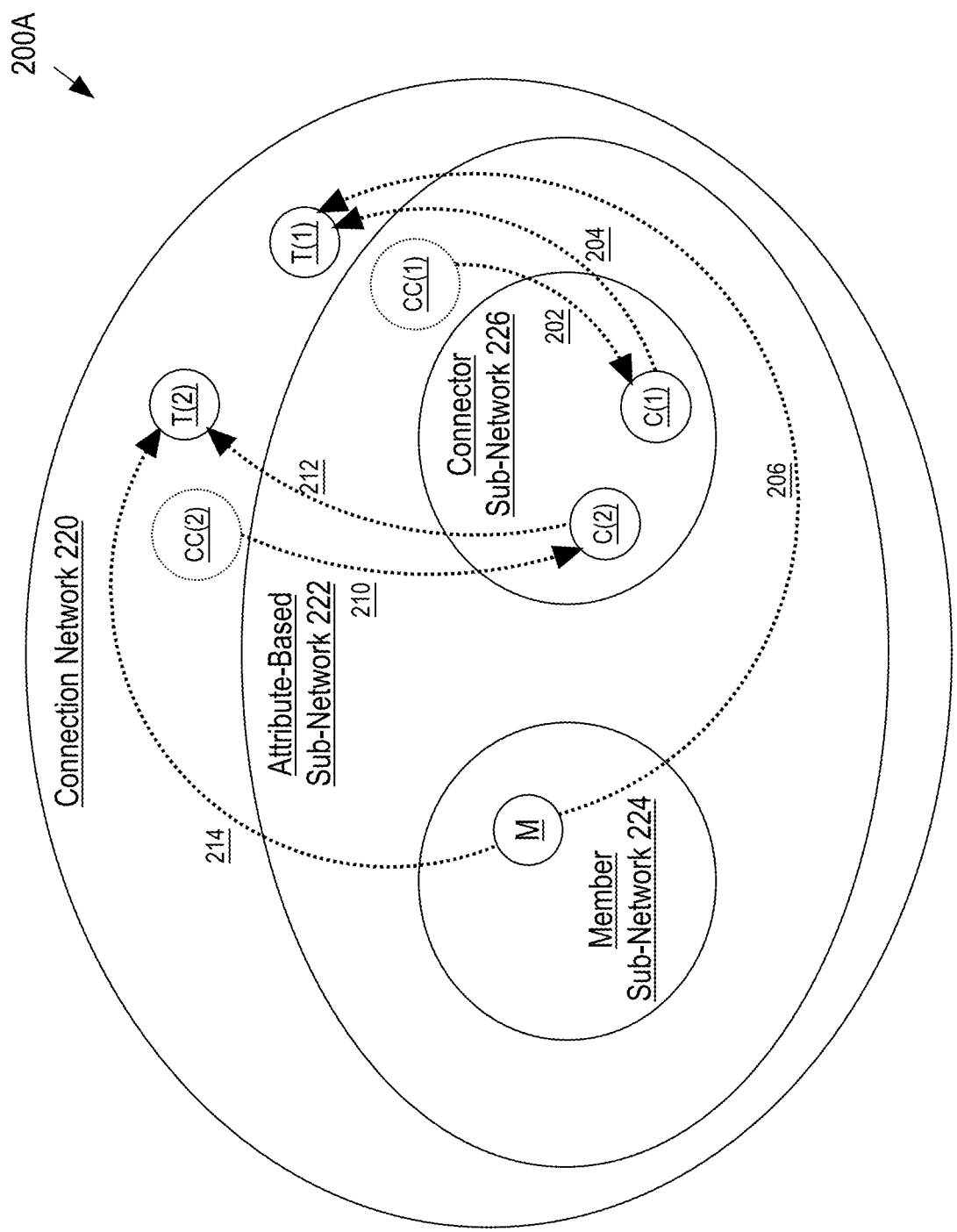
FIG. 2A is a schematic depiction of a connection network including a plurality of sub-networks and a plurality of nodes on the sub-networks, in an embodiment.

As used herein, candidate connector node may refer to a node on connection network 106 that is a candidate to be added to a connector sub-network, and connector node may refer to a node on connection network 106 that has been added to a connector sub-network. As used herein, connector sub-network may refer to a sub-network that is interposed by network-driven application 150 between connection network 106 and a member sub-network. An example of a network that includes a member sub-network and a connector sub-network interposed between the member sub-network and the network is shown in FIG. 2A and described in more detail below.

Connector identifying logic 152 may be implemented using a query language and conditional logic statements for determining variable query parameters or filters based on the existence of certain conditions. Examples of data interchange languages or formats that can be used to implement portions of connector identifying logic 152 include JSON (JavaScript Object Notation) and XML (eXtended Markup Language).

Context-free identifying logic 154 when executed by a processor identifies, to network-driven application 150, one or more candidate connector nodes. Context-free identifying logic 154 includes a computer implementation of an algorithm (or multiple algorithms) for measuring connection strengths between nodes on connection network 106, analyzing connection strength data associated with candidate connector nodes and ranking candidate connector nodes based on connection strength data values resulting from the connection strength analysis.

Context-free identifying logic 154 may determine connection strength between two nodes by, for instance, determining the number of attributes that two nodes have in common, determining particular attributes that two nodes have in common, determining the recency or duration of a connection made between two nodes, and/or determining the frequency with which two nodes exchange electronic communications (within or external to connection network 106).

Context-free identifying logic 154 may analyze and draw inferences from semantics that are associated with node-specific attribute information, in order to determine or adjust a connection strength data value. For instance, if a particular node has a 'title' attribute that is populated with text that includes the word 'head' or 'chief' or 'executive,' context-free identifying logic 154 may increase a connection strength data value associated with that node. As another example, if a particular node's recent communication history with respect to the connection network 106 indicates infrequent use of the connection network 106, context-free identifying logic 154 may decrease a connection strength data value associated with the node. Context-free identifying logic 154 may adjust a connection strength data value by, for example, adding or subtracting a predetermined weight data value to the connection strength data value.

Context-free identifying logic 154 is considered 'context-free' because it can execute independently of any particular transaction-related context. In other words, context-free identifying logic 154 can be used by network-driven application 150 to search for candidate connector nodes on connection network 106, or to search for connector nodes in a connector sub-network, generally.

Contextual identifying logic 156 includes a context-specific implementation of context-free identifying logic 154. That is, contextual identifying logic 156 can be used by network-driven application 150 to identify a set of candidate connector nodes or connector nodes in relation to a particular other node, such as a member node of a member sub-network and/or a target node of connection network 106. As such, contextual identifying logic 156 may include additional conditional logic statements for determining additional variable query parameters or filters based on the context within which contextual identifying logic 156 is being executed.

For instance, if a member node initiates execution of contextual identifying logic 156, contextual identifying logic 156 may include the member node's unique identifier as a parameter when searching for connector nodes, so that the search query returns node(s) that have a connection path with the member node. Similarly, if the member node identifies a particular target node, contextual identifying logic 156 may include the target node's unique identifier as a parameter when searching for connector nodes, so that the search query returns node(s) that have an existing connection path with the target node. The connection strength algorithm(s) can thus be executed to evaluate connection strength of a connector node or candidate connector node with respect to a particular member node and/or a particular target node.

In some implementations, network-driven application 150 can execute context-free identifying logic 154 and contextual identifying logic 156 in combination or iteratively, in accordance with the requirements of a particular design of the computing system 100.

A set of candidate connector nodes or connector nodes generated by context-free identifying logic 154 and/or contextual identifying logic 156 can be communicated by network-driven application 150 over network 120 for display by display device 170 via member interface 130.

Sub-Network Coordination

Network coordination engine 158 creates sub-networks of connection network 106, including particular connector sub-networks and member sub-networks, adds nodes to the sub-networks, and coordinates communications between nodes across the different sub-networks of connection network 106. If a particular sub-network is already created, network coordination engine 158 can determine the particular sub-network by, for example, querying connection graph 108.

In an embodiment, network coordination engine 158 instantiates a particular member sub-network of connection network 106 by adding a member sub-network data object to connection graph 108 and associating the member sub-network with a particular set of privilege data in connection graph 108. For example, nodes in the member sub-network may be granted access to various functionality of network-driven application 150, including connector identifying logic 152, where such functionality is not made available to other nodes on connection network 106. Network coordination engine 158 adds nodes to a particular member sub-network by populating a sub-network data field of a node data object in connection graph 108 with the particular member sub-network information (including a member sub-network unique identifier, for example).

Network coordination engine 158 instantiates a particular connector sub-network of connection network 106 by adding a connector sub-network data object to connection graph 108 and associating the connector sub-network with a particular member sub-network in connection graph 108. In an embodiment, network coordination engine 158 adds connector nodes identified by connector identifying logic 152 to a particular connector sub-network of connection network 106 by populating a sub-network data field of a node data object in connection graph 108 with the particular connector sub-network information (including a connector sub-network unique identifier, for example). Nodes in the connector sub-network may contain one or more additional attributes that can be populated with data values and used to signal to the associated member sub-network that the connector nodes are available for inclusion in connection paths that are generated by connector identifying logic 152.

FIG. 2A illustrates a network 200A that includes a connection network 220, a plurality of sub-networks 222, 224, 226 and a plurality of nodes M, CC(1), CC(2), T(1), T(2) on the sub-networks. Connection network 220 may be a registration-based network such as connection network 106, described above. Attribute-based sub-network 222 includes nodes of connection network 220 that have a data value of at least one attribute in common. For instance, nodes in attribute-based sub-network 222 may represent entities that are all currently employed by the same organization. Other implementations of connection network 220 may not include attribute-based sub-network 222. Member sub-network 224 is a proper subset of connection network 220 in that connection network 220 contains at least one node that is not in member sub-network 224. Similarly, in the illustrated implementation, member sub-network 224 is a proper subset of attribute-based sub-network 222.

Connector sub-network 226 is a proper subset of connection network 220. Connector sub-network 226 is interposed between member sub-network 224 and connection network 220 in that nodes of connector sub-network 226 are identified to member sub-network 224 as reachable by the member nodes, but connector nodes of connector sub-network 226 do not have the same privileges as member nodes (for instance, connector nodes do not have access to network-driven application 150 or transaction management system 112), and connector nodes of connector sub-network 226 are connected to one or more nodes in attribute-based sub-network 222 and/or connection network 220. In some implementations, connector sub-network 226 and member sub-network 224 may be considered mutually exclusive in that the intersection of the set of connector nodes in connector sub-network 226 and the set of member nodes in member sub-network 224 is a null set.

In operation, computing system 100 can identify candidate connector nodes CC(1) and CC(2) using, for example, context-free identifying logic 154. Candidate connector nodes CC(1) and CC(2) can be added to connector sub-network 226 by, for example, network coordination engine 158 in cooperation with member interface 130 and/or connector interface 132, as described in more detail below. Once added to connector sub-network 226, computing system 100 tags candidate connector nodes CC(1) and CC(2) as connector nodes, causing these nodes to then be denoted as C(1) and C(2), respectively, within connector sub-network 226. Tagging 202, 210 can be accomplished by, for example, network coordination engine 158 instantiating an attribute in, or associating metadata with, the CC(1) and CC(2) node data objects in connection graph 108.

Target nodes T(1) and T(2) are nodes in connection network 220 but are not connector nodes or member nodes. In the example of FIG. 2A, target nodes T(1) and T(2) are considered unreachable by member node M, however, target node T(1) is reachable by connector node C(1) via connection path 204, and target node T(2) is reachable by connector node C(2) via connection path 212. As such, computing system 100 can cause connector node C(1) to initiate a communication 206 between target node T(1) and member node M, even if a connection path does not already exist between connector node C(1) and member node M or between member node M and target node T(1).

Similarly, even if member node M does not have an existing connection path to either connector node C(2) or target node T(2), computing system 100 can cause connector node C(2) to initiate a communication 214 between member node M and target node T(2). Selection of connector nodes C(1) and C(2) to initiate communications between member node M and target nodes T(1), T(2) can be based on any of the connection strength determinations mentioned above. For example, computing system 100 may determine to utilize either C(1) or C(2) as connector nodes in the specific context of initiating communication between member node M and target nodes T(1), T(2) based on any combination of connection strengths measured between M and C(1) or C(2), and/or between M and T(1) or T(2), and/or between C(1) or C(2) and T(1) or T(2).

Figure 2B:
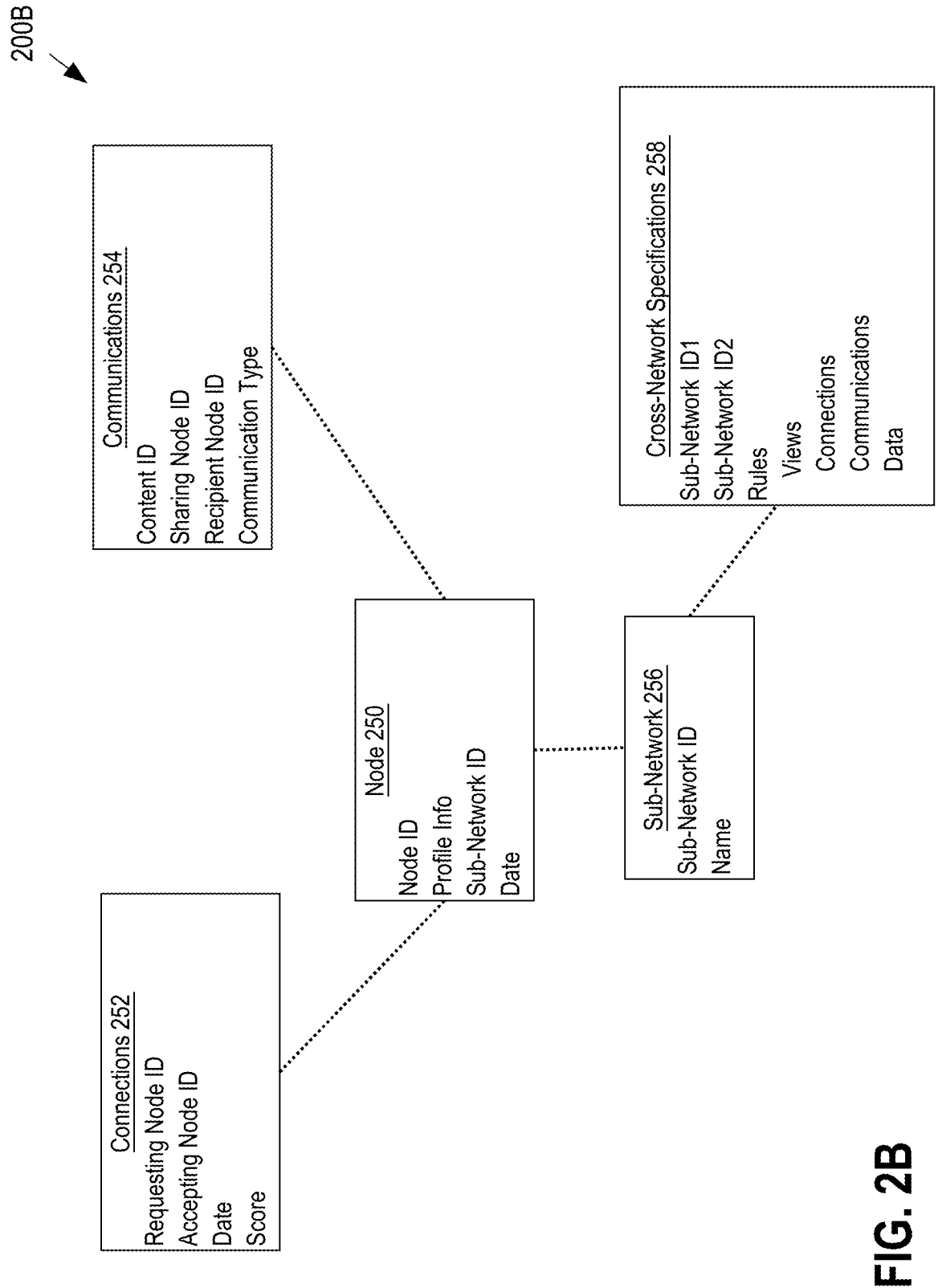
FIG. 2B is a data model diagram that depicts an approach for organizing and storing data relating to a connection network including sub-networks, in an embodiment.

FIG. 2B is a data model diagram 200B that depicts an approach for organizing and storing data relating to a connection network that includes member and connector sub-networks, in an embodiment. The data model can be implemented on a computer, using data objects including node 250, connections 252, communications 254, sub-network 256, cross-network specifications 258, and relationships between data objects (represented in the drawing by dotted lines). The illustrative node data object 250 has attributes including a unique node identifier, profile information, a unique sub-network identifier and one or more dates (such as the date that the node was added to a network or sub-network).

The sub-network identifier links an instance of node 250 to an instance of a sub-network data object 256. Instance or instantiation as used herein may refer to a computer process of populating a data object or an attribute of a data object with a variable or constant data value. Sub-network data object 256 has attributes including a unique sub-network identifier and sub-network name. The sub-network identifier links an instance of sub-network 256 to an instance of a cross-network specifications data object 258.

In an embodiment, cross-network specifications data object 258 has attributes including first and second sub-network identifiers and rules. Rules include computer-implemented statements pertaining to sub-network access privileges to views, connections, communications and data of another sub-network. As such, an instance of cross-network specifications 258 contains data and/or logic for coordinating communications from one sub-network to another sub-network (where the particular sub-networks governed by the specifications are indicated by the first and second sub-network identifiers). For example, if, in an instance of cross-network specifications 258, sub-network ID1 is 'member' and sub-network ID2 is 'connector' then the rules associated with that instance may govern member nodes' privileges with respect to the identified connector sub-network.

Use of the connector sub-network facilitates electronic communications between the member sub-network and the network, leading to a higher likelihood of a positive outcome from the communications. Without the connector sub-network, a party to the communication may not be aware that a path exists between the connector sub-network and the other party.

Node 250 is also linked with connections data object 252 and communications data object 254. Connections 252 contains data identifying connected node pairs and other data, such as the connection date and a score reflective of the connection strength. Communications 254 contains data indicating communication activity associated with an instance of node 250, as well as other attributes, such as a unique identifier of content contained in or associated with a communication (such as a hyperlink or web address) and a communication type. Types of communications can include in-network or out-of-network content shares and electronic messages.

Process Overview

Figure 3C:
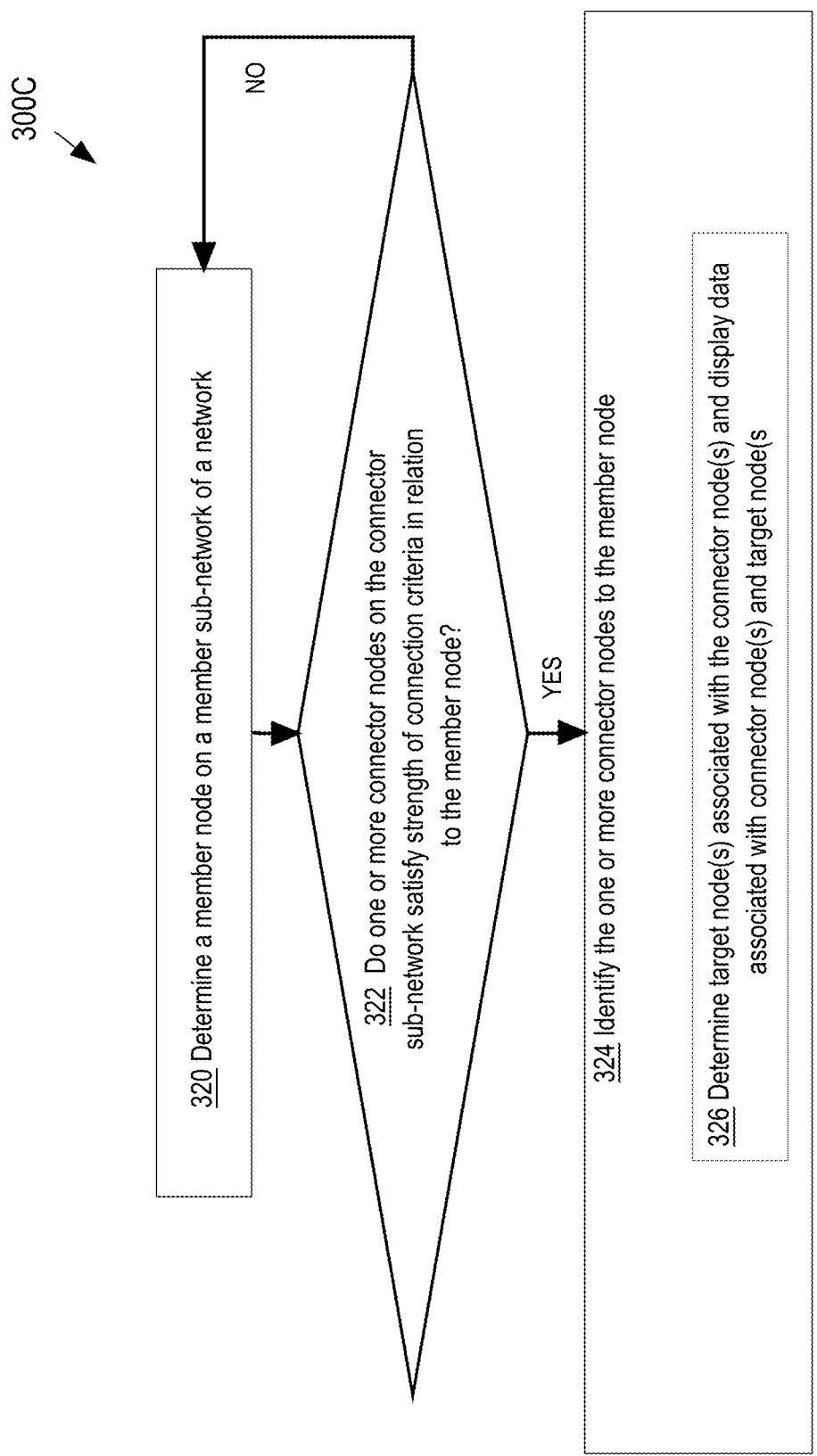
FIG. 3C is a flow diagram that depicts a process for identifying one or more connector nodes in association with a member node and a target node, in an embodiment.

FIGS. 3A, 3B, 3C, 3D illustrate processes that can be performed by computing system 100. FIG. 3A is a flow diagram that depicts a process 300A for determining a set of candidate connector nodes, in an embodiment. Process 300A may be performed by a single entity or program or by multiple entities or programs, including for example a browser plug-in and a remote server. The operations of the process as shown in FIG. 3A can be implemented using processor-executable instructions that are stored in computer memory. For purposes of providing a clear example, the operations of FIG. 3A are described as performed by computing device(s) 110, 140, which may be individually or collectively referred to as simply 'computing system 100.'

In operation 302, computing system 100 determines a set of candidate connector nodes on a network, such as connection network 220 or attribute-based sub-network 222 of FIG. 2. To do this, computing system 100 may determine a set of target nodes, for example by executing a search query, and for each of at least two candidate connector nodes in the set of candidate connector nodes, compute a plurality of rankings. A ranking can be computed by estimating a connector-target connection strength of a connection between the candidate connector node and a target node of the set of target nodes.

In some embodiments, rankings are determined by organizing potential connector nodes according to a normalized score. One example of a normalized score is connection strength both between the member node and the connector node, and the connector node and the target node. Connection strength can be computed based on a number of factors including time connected, frequency of communication with connected nodes, engagement with content produced by a connected node (such as the member node or the target node or the connector node), and other profile commonalities between nodes, such as shared schools, work overlap, geographical location, etc. Alternatively, or in addition, a node's past history of accepting or declining connection requests can be incorporated into the node's "connection strength" score.

Computing system 100 may sort the set of candidate connector nodes based on the plurality of rankings, and then using the sorted set of candidate connector nodes, evaluate the candidate connector nodes to determine if one or more connector criteria are satisfied, in operation 304. Examples of operations that may be executed by process 300B to determine whether connector criteria are satisfied include comparing candidate connector node rankings data to minimum or maximum connection strength threshold data values or acceptable ranges of connection strength data values. Candidate connector nodes can also be evaluated relative to one another rather than in comparison to reference data. For example, computing system 100 may simply select the highest-ranked candidate connector node(s) in operation 304.

In operation 306, computing system adds one or more of the candidate connector nodes selected by operation 304 to the connector sub-network, when a connector criterion is satisfied. If connector criteria are not satisfied in operation 304, computing system 100 may return to operation 302 and repeat the evaluation for a new set of candidate connector nodes, or simply end the process.

In another implementation, computing system 100 may undertake a similar process using a set of member nodes as the basis for evaluating candidate connector nodes. That is, computing system 100 may determine a set of member nodes, and for each of at least two candidate connector nodes in the set of candidate connector nodes, computing a plurality of rankings, where a ranking of the plurality of rankings is computed by estimating a connector-member connection strength of a connection between the candidate connector node and a member node of the set of member nodes.

Computing system 100 may sort the set of candidate connector nodes based on the rankings and based on the sorting, add one or more of the candidate connector nodes to the connector sub-network. Member-connector connection strengths can be evaluated using any of the approaches described above; for example, by comparison of connection strength rankings to reference data values and/or by comparing individual node rankings to one another. Computing system 100 may utilize a combination of connector-target connection strength and connector member connection strength to determine whether to add a particular candidate connector node to a candidate connector sub-network.

FIG. 3B is a flow diagram that depicts a process for initiating communication between a connector node and a target node, in an embodiment. Process 300B may be performed by a single entity or program or by multiple entities or programs, including for example a browser plug-in and a remote server. The operations of the process as shown in FIG. 3B can be implemented using processor-executable instructions that are stored in computer memory. For purposes of providing a clear example, the operations of FIG. 3B are described as performed by computing device(s) 110, 140, 142 which may be individually or collectively referred to as simply 'computing system 100.'

In operation 310, computing system 100 identifies a target node on a network, such as connection network 220 of FIG. 2A. A target node may be identified, for example, by a search query or by an interaction of a member node with a view of connection graph 108. In operation 312, computing system 100 determines whether a connector node on a connector sub-network satisfies one or more strength of connection criteria in relation to the target node. Any of the techniques for evaluating connection strength mentioned above may be used. For example, operation 312 may compute a connector-target connection strength value between the identified target node and one or more connector nodes in the connector sub-network, and compare the computed connection strengths to one another or to a reference connection strength value or range of connection strength values.

In operation 314, computing system 100 initiates communication between a member node and the target node using a connector node, when the connector node has satisfied the strength of connection criteria in operation 312. When the connection strength criteria are not satisfied in operation 312, computing system 100 may return to operation 310 and repeat the evaluation for another target node or may continue evaluating other connector nodes in operation 312 or simply end the process.

To initiate communication between a member node and the target node via a connector node, in operation 314, computing system 100 may cause the connector node to receive a message from the member node, where the message is displayed in connector interface 132. Computing system 100 may be designed so that information can be obtained from the connector node through only a small number of interactions between the connector node and connector interface 132. To do this, computing system may include in connector interface 132 a set of specially-designed interactive controls, each of which is associated with a specific set of computer instructions (implemented, for example, in a scripting language) to perform a specific set of functions.

In one embodiment, connector node need only provide two or fewer mouse clicks or taps on a touch screen in order to respond to a communication from a member node that requests assistance with connecting to a target node. In response to one or more of these interactions, computing system 100 can proceed to populate a pre-formed electronic message with information about the member node and send the pre-formed electronic message from the connector node to the target node, with the message populated with information about the member node. An example of such an electronic message is shown in FIG. 4B, described below.

In an embodiment, connector interface 132 is designed so that a connector node can easily accept, reject, or ask for clarification of a connection request. In the case that the request is eventually accepted, the member node can supply a pre-formed message for the connector node to use in its initial communication to the target node. The flow of interactions with connector interface 132 is driven programmatically, for example by a state machine that models the interactions and state transitions.

For example, if a connection path does not already exist between a connector node and a member node that is requesting a connection with the connector node, the simplicity of the processes executed by connector interface 132 to elicit responses to requests for assistance in connecting particular member nodes to particular target nodes can help clarify the strength of the relationships between the nodes and facilitate the next action. The connection strength clarifications obtained through connector node interactions with connector interface 132 can be modeled as a weighted determination, which can be used to establish "connection strength" for subsequent connection assistance requests. For instance, a connector node that has already declined a request to assist with making a connection between a member node and a particular target node may be ranked much lower for any subsequent connection assistance requests relating to the target node associated with the declined request. In this way, the history of communications between particular member nodes and particular connector nodes with respect to particular target nodes can be factored into subsequent connection strength determinations, which can then be used to select connector node candidates.

FIG. 3C is a flow diagram that depicts a process for identifying one or more connector nodes in association with a member node and, optionally, in association with a particular target node, in an embodiment. Process 300C may be performed by a single entity or program or by multiple entities or programs, including for example a browser plug-in and a remote server. The operations of the process as shown in FIG. 3C can be implemented using processor-executable instructions that are stored in computer memory. For purposes of providing a clear example, the operations of FIG. 3C are described as performed by computing device(s) 110, 140, which may be individually or collectively referred to as simply 'computing system 100.'

In operation 320, computing system 100 determines a member node on a network, such as connection network 220 of FIG. 2A. A member node may be identified, for example, by a search query initiated by another member node or as a result of a request by a member node to member interface 130 to identify a connector node, or as a result of a member node logging in to a member sub-network such as member sub-network 224.

In operation 322, computing system 100 determines whether a connector node on a connector sub-network such as connector sub-network 226 satisfies one or more strength of connection criteria in relation to the member node. Any of the techniques for evaluating connection strength mentioned above may be used. For example, operation 322 may compute a connector-member connection strength value indicative of the strength of a connection between the identified member node and one or more connector nodes in the connector sub-network, and compare the connection strength data computed for each member node-connector node pair to one another or to a reference value or to a range of reference values.

In operation 324, computing system 100 identifies one or more connector nodes to the member node identified in operation 320. In an embodiment, when a connector node has satisfied the strength of connection criteria in operation 322, computing system 100 may display an icon or thumbnail image of a person or entity associated with the connector node, in a view of member interface 130. In some embodiments, computing system 100 may execute operation 326 to determine one or more target nodes that are associated with the connector node(s) determined to satisfy the strength of connection criteria with member node in operation 322, and display information about the target nodes associated with the connector nodes in a display.

For instance, computing system 100 may compute or access previously-computed strength of connection data indicative of the strength of connection between each target node and a connector node, and display target nodes with which the connector node has the highest connection strength when compared to the connection strength between the target node and the member node identified in operation 320. FIG. 4A illustrates a display that may be generated by computing system 100, which identifies connector nodes and a target node in a view of an embodiment of member interface 130. When the connection strength criteria are not satisfied in operation 322, computing system 100 may continue evaluating other connector nodes in operation 322 or simply end the process.

FIG. 3D is a flow diagram that depicts a process for interposing a connector sub-network between a connection network and a member sub-network, in an embodiment. Process 300D may be performed by a single entity or program or by multiple entities or programs, including for example a browser plug-in and a remote server. The operations of the process as shown in FIG. 3D can be implemented using processor-executable instructions that are stored in computer memory. For purposes of providing a clear example, the operations of FIG. 3D are described as performed by computing device(s) 110 alone or in combination with computing device 140, which may be individually or collectively referred to as simply 'computing system 100.'

In operation 330, computing system 100 determines a member sub-network, such as member sub-network 224, of a connection network, such as connection network 220. To do this, computing system 100 may cause a member of a member sub-network to log in to the member sub-network, or computing system 100 may receive a data value from another executing process, which identifies a particular member sub-network.

In operation 332, computing system 100 determines whether the connection network includes other nodes, in addition to the nodes that are in the member sub-network. To do this, computing system 100 may execute a search query with a filter, on a connection graph of the connection network. If computing system 100 determines that there are no non-member nodes in the connection network, computing system 100 may return to operation 330 or end. When computing system 100 determines that the connection network includes nodes other than the member nodes of the member sub-network, computing system 100 proceeds to operation 334.

In operation 334, computing system 100 interposes a connector sub-network between the member sub-network and the connection network. To do this, in an embodiment, computing system 100 creates a data object for the connector sub-network, instantiates the data object with data values indicating the attributes or properties of the connector sub-network, including data that identifies the sub-network and data that indicates relationships and privileges between the connector sub-network and the member sub-network, and adds the data object, and its appropriate links, to the connection graph and its underlying data structure. In an embodiment, access privileges are associated with the connector sub-network data object that restrict access by connector nodes to information and/or software tools that are available to member nodes.

In operation 336, computing system 100 adds one or more nodes of the connection network that are not member nodes to the connector sub-network established in operation 334. To do this, in an embodiment, computing system 100 populates a connector sub-network attribute of the node data object of a particular node with the sub-network identifier data value associated with the connector sub-network in operation 336.

In operation 338, computing system 100 traverses the connection graph, particularly the connector sub-network, and determines a connection path to connect a particular target node to a particular member node of the member sub-network. To do this, in an embodiment, computing system 100 computes, or evaluates previously computed, connection strength values using the techniques described above. In an embodiment, computing system 100 compares connection strength data for each of a number of connector nodes with the target node to the connection strength data for the member node-target node pair, and generates one or more candidate connection paths that use one or more connector nodes to connect the member node to the target node.

In operation 340, computing system 100 calculates a score for each of the connection paths generated in operation 338. To do this, in an embodiment, computing system 100 may aggregate or compute a sum of the connection strength data values for all of the individual connections in the particular connection path or may determine the score based on the last connection in the connection path, which connects directly to the target node.

In operation 342, computing system 100 selects a connection path of the one or more connection paths generates in operation 338, based on the score(s) computed in operation 340. To do this, in an embodiment, computing system selects the connection path with the highest score. Using the selected connection path, computing system 100 initiates a communication between the member node identified in operation 338 and the target node identified in operation 338, using a connector node in the selected connection path. In an embodiment, computing system 100 mathematically determines which of the connector nodes to use to initiate the communication between the member node and the target node by comparing the connector-member connection strength data values for each of the connector nodes in the connection path. For example, the algorithm executed by operation 342 selects the connector node to initiate the communication based on a combination of the connection strength between the connector node and the member node and the connection strength between the connector node and the target node.

To initiate the communication between the member node and the target node, computing system 100 causes sending of a communication from the member node to the connector node. In an embodiment, the communication includes one or more embedded interactive elements that are designed to minimize the number of interactions needed to be performed by the connector node to initiate communication between the member node and the target node. An example of a communication that computing system 100 may cause to be sent by a member node to a connector node is shown in FIG. 4B, described below.

Use Case: Identifying Connector Nodes

As a specific example, FIG. 4A is a screen capture of a user interface that may be displayed by member interface 130 when a member node is logged in to a member sub-network. Screen capture 400A includes a view 420 of data relating to a target node, KEY INFLUENCER. The target node data includes a digital image 440 and interactive controls 442, 444, which can enable the member node to communicate directly with the target node.

However, using the technologies disclosed herein, screen capture 400A also displays information about a particular connector node, including a digital image 446, and an interactive element 448. In window 422, screen capture 400A displays text of a message sent by the member node to the connector node. In window 424, screen capture 400A displays a portion of a connection graph, which visually depicts information about the connection path between the member node, represented in the connection graph by a thumbnail image 426, and the target node, represented in the connection graph by a thumbnail image 438. The connection path includes a thumbnail image 430 that represents the connector node that has been selected using the disclosed techniques. Other candidate connector nodes are also represented by thumbnail images 432, 434. This allows the member node to override the system-generated connector node selection and choose a different connector node, if desired.

Alternatively, or in addition, computing system 100 may automatically update the scores for the connector nodes 430, 432, 434 as node data changes are detected, and may reorder the connector nodes if, for example, connector node 432 or connector node 434 has a higher score than connector node 430 after the node data update. In an embodiment, the text "Ask CONNECTOR about KEY INFLUENCER" is an active hyperlink that, when activated, causes computing system 100 to initiate transmission of a message from the member node to the top-ranked connector node, 430 that automatically includes information about the target node. In an embodiment, the text "Mention CONNECTOR to KEY INFLUENCER" is another active hyperlink that, when activated, causes computing system 100 to initiate transmission of a message from the member node to the target node that automatically includes information about the top-ranked connector node, 430.

Element 436 includes a textual explanation of the connection strength that has been computed by computing system 100 between the connector node and the target node using the disclosed technologies. Element 428 is an interactive graphical indicator designed to indicate to the member node that the connector nodes 430, 432, 434, and indeed the target node 438, are outside of the member sub-network. When selected, element 428 calls out commonalities between the member node and the connector to facilitate initial communication between the member node and the connector node.

Use Case: Initiating Communication with a Connector Node

As another specific example, FIG. 4B is a screen capture 400B of a message communication that may be automatically transmitted to and displayed by a connector node in connector interface 132 when computing system 100 detects activation of the "Ask CONNECTOR about KEY INFLUENCER" link in the screen capture 400A of FIG. 4A in a member interface 130. Screen capture 400B includes a template message that includes text 402, 404 and parameter placeholders, such as placeholders 405, 406, 407, 409, 411, 413, 415, 417. Variable data may be extracted from member node, target node, and connector node data in the connection graph 108 and automatically inserted into these placeholders (replacing the placeholder text) when computing system 100 generates the message 400B for a particular member node context. Message 400B also includes interactive elements 408, 410, 412, 414. When message 400B is viewed through connector interface 132 by a connector node, one of these interactive elements can be activated to initiate, by the connector node, one or more of the automatic actions described above. For example, activation of element 408 may cause computing system 100 to automatically generate a message including the text 404 and transmit the message to a target node. Activation of element 410 may cause computing system 100 to automatically generate and send a message from the connector node to the member node. Activation of element 412 may cause computing system 100 to initiate a different form of message from the connector node to the member node. Activation of element 414 may cause computing system 100 to update the connector node data object to turn off a flag that signals that the connector node is available for communication with the member node.

Benefits that may be realized by at least some embodiments described herein include automatic identification of connector nodes, and improved user interface functionality to initiate communication between a member node and a connector node, and between a member node and a target node (that otherwise may be unreachable relative to the member node) using the connector node. These improvements to computer functionality can improve the quality communications between member nodes and connector nodes, and between member nodes. These improvements can reduce low-quality communications which can, in turn, improve the overall bandwidth of the connection network.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
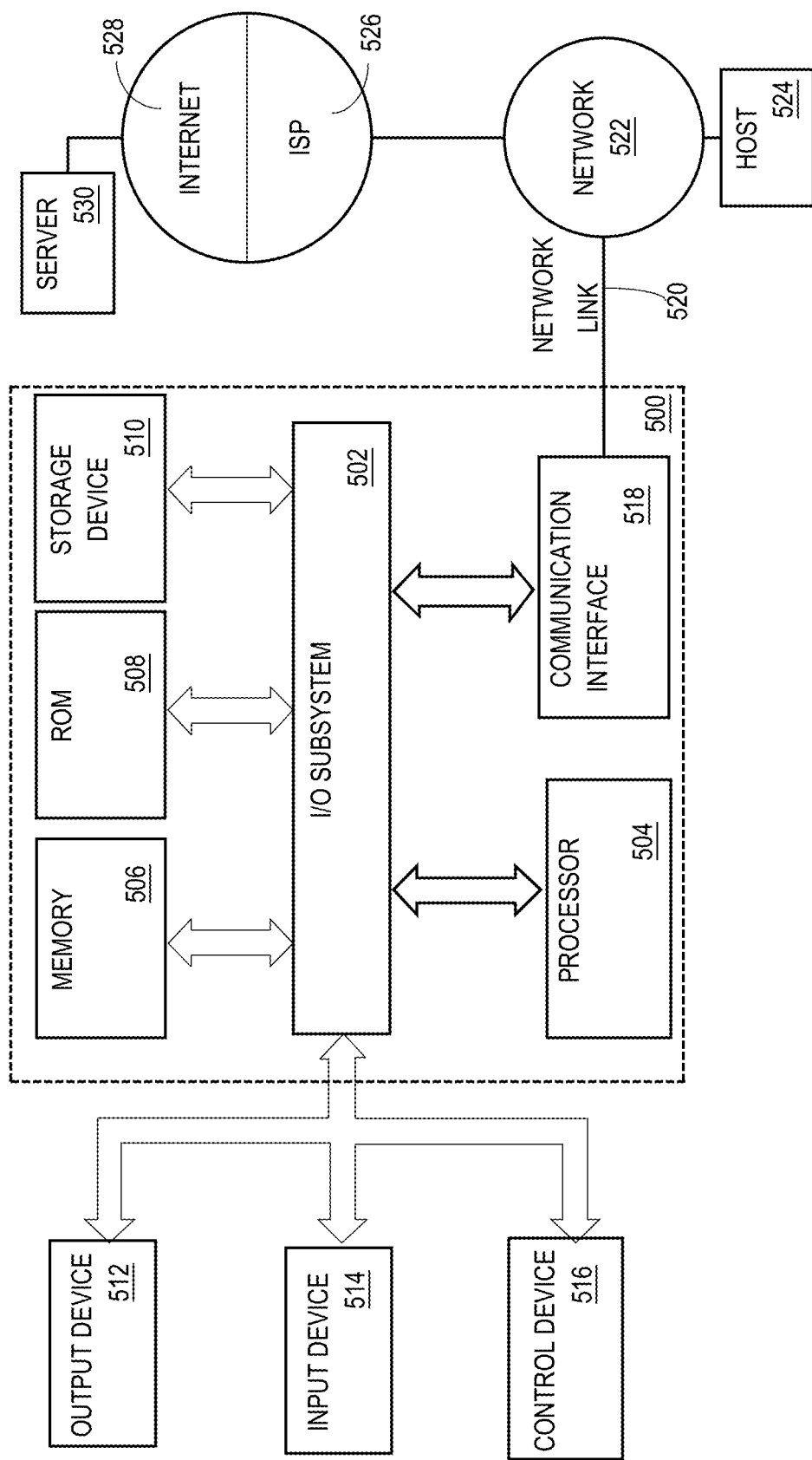
FIG. 5 is a block diagram that illustrates a computer system upon which an embodiment of the present invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a system includes one or more processors; one or more storage media storing instructions which, when executed by the one or more processors, cause, using connection graph data that represents connections between nodes in a connection network, the one or more processors to perform operations including: creating a member sub-network that comprises a plurality of member nodes and is a proper subset of the connection network by granting access to a particular network-driven application to the member nodes and without granting access to the particular network-driven application to nodes that are not in the member sub-network; interposing a connector sub-network between the connection network and the member sub-network by tagging one or more nodes of the connection network that are not in the member sub-network as connector nodes that have a plurality of connection paths to other nodes of the connection network that are not in the member sub-network; identifying the one or more connector nodes to the member sub-network without granting, to the one or more connector nodes, access to the particular network-driven application.

An example 2 includes the subject matter of example 1, wherein the instructions, when executed by the one or more processors, further cause, in response to identification of a target node that is not in the member sub-network or the connector sub-network, determining a connection path to connect the target node to a member node of the member sub-network using a connector node of the connector sub-network; computing a score relating to the connection path; based on the score, initiate, by the connector node, a communication between the member node and the target node.

An example 3 includes the subject matter of example 2, wherein computing the score comprises estimating a connector-target connection strength of a connection between the connector node and the target node, estimating a member-target connection strength of a connection between the member node and the target node, comparing the connector-target connection strength to the member-target connection strength.

An example 4 includes the subject matter of example 2, wherein computing the score comprises estimating a member-connector connection strength of a connection between the member node and the connector node, estimating a member-target connection strength of a connection between the member node and the target node, comparing the member-connector connection strength to the member-target connection strength.

An example 5 includes the subject matter of example 2, wherein computing the score comprises estimating a member-connector connection strength of a connection between the member node and the connector node, comparing the member-connector connection strength to member-connector connection strengths computed for connections between the member node and other connector nodes.

An example 6 includes the subject matter of example 2, wherein computing the score comprises estimating a connector-target connection strength of a connection between the connector node and the target node, comparing the connector-target connection strength to connector-target connection strengths computed for connections between the connector node and other target nodes.

An example 7 includes the subject matter of example 1 or example 2, wherein the instructions, when executed by the one or more processors, further cause the one or more processors to perform operations including: determining a set of candidate connector nodes; determining a set of target nodes; for each of at least two candidate connector nodes in the set of candidate connector nodes, computing a plurality of rankings, wherein a ranking of the plurality of rankings is computed by estimating a connector-target connection strength of a connection between the candidate connector node and a target node of the set of target nodes; sorting the set of candidate connector nodes based on the plurality of rankings; based on the sorting, adding one or more of the candidate connector nodes to the connector sub-network.

An example 8 includes the subject matter of example 1 or example 2, wherein the instructions, when executed by the one or more processors, further cause the one or more processors to perform operations including determining a set of candidate connector nodes; determining a set of member nodes; for each of at least two candidate connector nodes in the set of candidate connector nodes, computing a plurality of rankings, wherein a ranking of the plurality of rankings is computed by estimating a connector-member connection strength of a connection between the candidate connector node and a member node of the set of member nodes; sorting the set of candidate connector nodes based on the plurality of rankings; based on the sorting, adding one or more of the candidate connector nodes to the connector sub-network.

An example 9 includes the subject matter of example 2, wherein the instructions, when executed by the one or more processors, further cause the one or more processors to perform operations including: causing to display, by a display device communicatively coupled to the one or more processors, a view comprising an image associated with the member node, an image associated with each of a plurality of connector nodes, an image associated with the target node, a graphical indicator to indicate that the connector nodes are not in the member sub-network.

An example 10 includes the subject matter of example 9, wherein the instructions, when executed by the one or more processors, further cause the one or more processors to perform operations including adjusting a displayed of an image associated with a connector node based on a strength-of-connection score associated with the connector node.

An example 11 includes the subject matter of example 2, wherein the instructions, when executed by the one or more processors, cause the one or more processors to perform operations including causing to display, by a display device communicatively coupled to the one or more processors, an interactive message; in response to detecting not more than two interactions by the connector node with the interactive message, sending a communication from the connector node to the target node to initiate a communication between the target node and the member node.

An example includes the subject matter of example 2, wherein the instructions, when executed by the one or more processors, cause the one or more processors to perform operations including modifying the score based on an analysis of public information associated with the connector node.

In an example 13, a method includes accessing connection graph data, wherein the connection graph data comprises a plurality of data objects that represent nodes on a network and connection data that indicate connections between the nodes on a connection network; using the connection graph data, determining a connector node of the connection network; adding the connector node to a connector sub-network of the connection network, wherein the connector sub-network is a proper subset of the connection network; determining a member node of a member sub-network of the connection network, wherein the member sub-network is a proper subset of the connection network and member privilege data is associated with the member sub-network but is not associated with nodes of the connection network that are not in the member sub-network; determining a target node of the connection network; comparing connection data associated with the connector node and the target node to connection data associated with the member node and the target node; based on the comparing, sending a message over the connection network to a computing device associated with the connector node; detecting an interaction by the connector node with an interactive element of the message; in response to the interaction, initiating an electronic communication between the member node and the target node, wherein the method is performed by one or more computing devices.

An example 14 includes the subject matter of example 13, and includes determining member-connector connection strength data associated with a connection path between the connector node and the member node; comparing the member-connector connection strength data to a threshold data value; in response to the member-connector connection strength data exceeding the threshold data value, determining connector-target connection strength data associated with a connection path between the connector node and the target node; selecting the connector node based on the member-connector connection strength data and the connector-target connection strength data.

An example 15 includes the subject matter of example 14, and includes determining one or more of the member-connector connection strength data or the connector-target connection strength data based on an analysis of one or more inputs that are received from one or more of an electronic messaging system or a customer relationship management system or a public network.

An example 16 includes the subject matter of example 13, and includes displaying, on a computing device associated with the member node, an interactive element to initiate communication with the connector node.

In an example 17, one or more non-transitory computer-readable storage media comprising instructions which, when executed by one or more processors, cause: determining a connector node of a connection network; adding the connector node to a connector sub-network of the connection network, wherein the connector sub-network is a proper subset of the connection network; determining a member node of a member sub-network of the connection network, wherein the member sub-network is a proper subset of the connection network; determining a target node of the connection network; determining connector-target connection data associated with the connector node and the target node; determining member-target connection data associated with the member node and the target node; determining member-connector connection data associated with the member node and the connector node; in response to a combination of the connector-target connection data and the member-target connection data and the member-connector connection data, initiating an electronic communication between the member node and the target node.

An example 18. includes the subject matter of example 17, wherein the instructions, when executed by the one or more processors, further cause: in response to the member-connector connection data satisfying a strength of connection criterion, determining the connector-target connection data based on a connection path between the connector node and the target node; selecting the connector node based on the member-connector connection data and the connector-target connection data.

An example 19 includes the subject matter of example 17, wherein the instructions, when executed by the one or more processors, further cause: determining one or more of the member-connector connection data or the connector-target connection data based on an analysis of one or more inputs that are received from a customer relationship management system.

An example 20 includes the subject matter of example 17, wherein the instructions, when executed by the one or more processors, further cause, automatically in response to an interaction detected in a member interface displayed in a display device associated with the member node, displaying, in a connector interface of a display device associated with the connector node, a message comprising an embedded interactive element to initiate a communication between the member node and the target node.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause, using connection graph data that represents connections between nodes in a connection network, the one or more processors to perform operations comprising:

creating a member sub-network that comprises a plurality of member nodes and is a subset of the connection network;

tagging one or more nodes of the connection network that are not in the member sub-network as connector nodes of a connector sub-network that have a plurality of connection paths to other nodes of the connection network that are outside the member sub-network;

identifying the one or more connector nodes to the member sub-network;

in response to identification of a target node that is outside the member sub- network and the connector sub-network, determining a previously unidentified connection path to connect the target node to a member node of the member sub-network using a connector node of the connector sub-network;

computing a score relating to the previously unidentified connection path;

based on the score, initiating, by the connector node, a communication between the member node and the target node.

2. The system of claim 1, wherein computing the score comprises estimating a connector-target connection strength of a connection between the connector node and the target node, estimating a member-target connection strength of a connection between the member node and the target node, comparing the connector-target connection strength to the member-target connection strength.

3. The system of claim 1, wherein computing the score comprises estimating a member-connector connection strength of a connection between the member node and the connector node, estimating a member-target connection strength of a connection between the member node and the target node, comparing the member-connector connection strength to the member-target connection strength.

4. The system of claim 1, wherein computing the score comprises estimating a member-connector connection strength of a connection between the member node and the connector node, comparing the member-connector connection strength to member-connector connection strengths computed for connections between the member node and other connector nodes.

5. The system of claim 1, wherein computing the score comprises estimating a connector-target connection strength of a connection between the connector node and the target node, comparing the connector-target connection strength to connector-target connection strengths computed for connections between the connector node and other target nodes.

6. The system of claim 1, wherein the instructions, when executed by the one or more processors, further cause the one or more processors to perform operations comprising:

determining a set of candidate connector nodes;
determining a set of member nodes;
for each of at least two candidate connector nodes in the set of candidate connector nodes, computing a plurality of rankings, wherein a ranking of the plurality of rankings is computed by estimating a connector-member connection strength of a connection between the candidate connector node and a member node of the set of member nodes;
sorting the set of candidate connector nodes based on the plurality of rankings;
based on the sorting, adding one or more of the candidate connector nodes to the connector sub-network.

7. The system of claim 1, wherein the instructions, when executed by the one or more processors, further cause the one or more processors to perform operations comprising:

causing to display, by a display device communicatively coupled to the one or more processors, a view comprising an image associated with the member node, an image associated with each of a plurality of connector nodes, an image associated with the target node, a graphical indicator to indicate that the connector nodes are not in the member sub-network.

8. The system of claim 1, wherein the instructions, when executed by the one or more processors, further cause the one or more processors to perform operations comprising:

adjusting a display of an image associated with a connector node based on a strength-of-connection score associated with the connector node.

9. The system of claim 1, wherein the instructions, when executed by the one or more processors, cause the one or more processors to perform operations comprising:

causing to display, by a display device communicatively coupled to the one or more processors, an interactive message;
in response to detecting not more than two interactions by the connector node with the interactive message, sending a communication from the connector node to the target node to initiate a communication between the target node and the member node.

10. The system of claim 1, wherein the instructions, when executed by the one or more processors, cause the one or more processors to perform operations comprising:

modifying the score based on an analysis of public information associated with the connector node.

11. A method comprising:

creating a member sub-network that comprises a plurality of member nodes and is a subset of a connection network;

tagging one or more nodes of the connection network that are not in the member sub-network as connector nodes of a connector sub-network that have a plurality of connection paths to other nodes of the connection network that are outside the member sub-network;

identifying the one or more connector nodes to the member sub-network;

in response to identification of a target node that is outside the member sub-network and the connector sub-network, determining a previously unidentified connection path to connect the target node to a member node of the member sub-network using a connector node of the connector sub-network;

computing a score relating to the previously unidentified connection path;

based on the score, initiating, by the connector node, a communication between the member node and the target node.

12. The method of claim 11, wherein computing the score comprises estimating a connector-target connection strength of a connection between the connector node and the target node, estimating a member-target connection strength of a connection between the member node and the target node, comparing the connector-target connection strength to the member-target connection strength.

13. The method of claim 11, wherein computing the score comprises estimating a member-connector connection strength of a connection between the member node and the connector node, estimating a member-target connection strength of a connection between the member node and the target node, comparing the member-connector connection strength to the member-target connection strength.

14. The method of claim 11, wherein computing the score comprises estimating a member-connector connection strength of a connection between the member node and the connector node, comparing the member-connector connection strength to member-connector connection strengths computed for connections between the member node and other connector nodes.

15. The method of claim 11, wherein computing the score comprises estimating a connector-target connection strength of a connection between the connector node and the target node, comparing the connector-target connection strength to connector-target connection strengths computed for connections between the connector node and other target nodes.

16. The method of claim 11, further comprising:
determining a set of candidate connector nodes;
determining a set of member nodes;
for each of at least two candidate connector nodes in the set of candidate connector nodes, computing a plurality of rankings, wherein a ranking of the plurality of rankings is computed by estimating a connector-member connection strength of a connection between the candidate connector node and a member node of the set of member nodes;
sorting the set of candidate connector nodes based on the plurality of rankings;
based on the sorting, adding one or more of the candidate connector nodes to the connector sub-network.

17. The method of claim 11, further comprising:
causing to display, by a display device communicatively coupled to the one or more processors, a view comprising an image associated with the member node, an image associated with each of a plurality of connector nodes, an image associated with the target node, a graphical indicator to indicate that the connector nodes are not in the member sub-network.

18. The method of claim 11, further comprising:
adjusting a display of an image associated with a connector node based on a strength-of-connection score associated with the connector node.

19. The method of claim 11 further comprising:
causing to display, by a display device communicatively coupled to the one or more processors, an interactive message;
in response to detecting not more than two interactions by the connector node with the interactive message, sending a communication from the connector node to the target node to initiate a communication between the target node and the member node.

20. The method of claim 11, further comprising:
modifying the score based on an analysis of public information associated with the connector node.

* * * * *